US011887574B2

(12) United States Patent
Sung et al.

(10) Patent No.: US 11,887,574 B2
(45) Date of Patent: Jan. 30, 2024

(54) WEARABLE ELECTRONIC APPARATUS AND METHOD FOR CONTROLLING THEREOF

(71) Applicant: SAMSUNG ELECTRONICS CO., LTD., Suwon-si (KR)

(72) Inventors: Hosang Sung, Suwon-si (KR); Lei Yang, Beijing (CN); Jonguk Yoo, Suwon-si (KR); Jonghoon Jeong, Suwon-si (KR); Kihyun Choo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 17/578,164

(22) Filed: Jan. 18, 2022

(65) Prior Publication Data

US 2022/0246129 A1 Aug. 4, 2022

Related U.S. Application Data

(63) Continuation of application No. PCT/KR2021/015726, filed on Nov. 2, 2021.

(30) Foreign Application Priority Data

Feb. 1, 2021 (KR) ........................ 10-2021-0014234

(51) Int. Cl.
*G10K 11/178* (2006.01)
*G10L 25/78* (2013.01)

(52) U.S. Cl.
CPC .. *G10K 11/17827* (2018.01); *G10K 11/17823* (2018.01); *G10K 11/17873* (2018.01);
(Continued)

(58) Field of Classification Search
None
See application file for complete search history.

(56) References Cited

U.S. PATENT DOCUMENTS

| | | | |
|---|---|---|---|
| 9,055,366 | B2 | 6/2015 | Azmi et al. |
| 10,397,687 | B2 | 8/2019 | Watts et al. |

(Continued)

FOREIGN PATENT DOCUMENTS

| | | | |
|---|---|---|---|
| JP | 2010019876 | A | 1/2010 |
| JP | 2020076923 | A | 5/2020 |

(Continued)

OTHER PUBLICATIONS

Written Opinion (PCT/ISA/237) dated Feb. 21, 2022 issued by the International searching Authority for International Application No. PCT/KR2021/015726.

(Continued)

*Primary Examiner* — Kenny H Truong
(74) *Attorney, Agent, or Firm* — Sughrue Mion, PLLC

(57) ABSTRACT

A controlling method of a wearable electronic apparatus includes: receiving, by an IMU sensor, a bone conduction signal corresponding to vibration in the user's face, while the wearable electronic apparatus is operated in an ANC mode; identifying a presence or an absence of the user's voice based on the bone conduction signal; based on the identifying the presence of the user's voice, controlling an operation mode of the wearable electronic apparatus to be a different operation mode from the ANC mode; while the wearable electronic apparatus is operated in the different operation mode, identifying presence or absence of the user's voice based on the bone conduction signal; and based on the absence of the user's voice being identified for a predetermined time while the wearable electronic apparatus (Continued)

is operated in the different operation mode, controlling the different operation mode to return to the ANC mode.

19 Claims, 10 Drawing Sheets

(52) U.S. Cl.
CPC ........ *G10K 11/17885* (2018.01); *G10L 25/78* (2013.01); *G10K 2210/1081* (2013.01); *G10K 2210/3036* (2013.01)

(56) References Cited

U.S. PATENT DOCUMENTS

| | | | |
|---|---|---|---|
| 10,564,925 B2 | 2/2020 | An et al. | |
| 10,757,501 B2 | 8/2020 | Mehra et al. | |
| 11,308,977 B2 | 4/2022 | Moon et al. | |
| 11,317,188 B2 | 4/2022 | Mehra et al. | |
| 2007/0088544 A1* | 4/2007 | Acero | G10L 21/02 704/226 |
| 2014/0205131 A1 | 7/2014 | Azmi et al. | |
| 2017/0193978 A1* | 7/2017 | Goldman | G10K 11/17881 |
| 2019/0342647 A1 | 11/2019 | Mehra et al. | |
| 2020/0152225 A1 | 5/2020 | Numata et al. | |
| 2020/0219525 A1 | 7/2020 | Moon et al. | |
| 2020/0258539 A1 | 8/2020 | Shim et al. | |
| 2020/0389716 A1 | 12/2020 | Mehra et al. | |

FOREIGN PATENT DOCUMENTS

| | | |
|---|---|---|
| KR | 10-2013-0036867 A | 4/2013 |
| KR | 101631192 B1 | 6/2016 |
| KR | 10-2015-0108907 A | 9/2017 |
| KR | 101898911 B1 | 10/2018 |
| KR | 10-2020-0085030 A | 7/2020 |
| KR | 10-2020-0098323 A | 8/2020 |
| KR | 10-2021-0005168 A | 1/2021 |

OTHER PUBLICATIONS

Search Report (PCT/ISA/210) dated Feb. 21, 2022 issued by the International searching Authority for International Application No. PCT/KR2021/015726.

* cited by examiner

WEARABLE ELECTRONIC APPARATUS AND METHOD FOR CONTROLLING THEREOF

CROSS-REFERENCE TO RELATED APPLICATION(S)

This application is a bypass continuation of International Application No. PCT/KR2021/015726, filed on Nov. 2, 2021, which is based on and claims priority to Korean Patent Application No. 10-2021-0014234, filed on Feb. 1, 2021, in the Korean Intellectual Property Office, the disclosures of which are incorporated by reference herein in their entireties.

BACKGROUND ART

Field

The disclosure relates to a wearable electronic apparatus and a controlling method thereof, and, more particularly, to a wearable electronic apparatus identifying a dialog situation based on a user's speech and changing its operation mode, and a controlling method thereof.

Description of the Related Art

In recent years, technology for wearable earphones worn on user's ears has been developed, and active noise cancellation (ANC) technology for wearable earphones has thus also been developed.

The ANC technology is technology for canceling or blocking an external noise that may be interference if the user listens to music by the wearable earphones. In detail, it is possible to receive the external noise by a microphone of the wearable earphone and convert the noise into a data signal, generate a reverse-phase wavelength corresponding thereto and provide the wavelength to a speaker of the wearable earphone, thereby canceling or blocking the external noise.

However, in the related art, the user has been required to directly control the ANC function by turning on or off this function.

DISCLOSURE

Technical Problem

Embodiments provide a wearable electronic apparatus identifying a dialog situation based on a user's speech and changing its operation mode based on the dialog situation, and a controlling method thereof.

Technical Solution

In accordance with an aspect of the disclosure, there is provided a controlling method of a wearable electronic apparatus worn on user's ears. The controlling method includes: receiving, by an inertial measurement unit sensor, a bone conduction signal corresponding to vibration generated in the user's face, while the wearable electronic apparatus is operated in an active noise cancellation (ANC) mode; identifying a presence or an absence of the user's voice based on the bone conduction signal while the wearable electronic apparatus is operated in the ANC mode; based on the identifying the presence of the user's voice while the wearable electronic apparatus is operated in the ANC mode, controlling an operation mode of the wearable electronic apparatus to be a different operation mode from the ANC mode; while the wearable electronic apparatus is operated in the different operation mode, identifying a presence or an absence of the user's voice based on the bone conduction signal; and based on the absence of the user's voice being identified for a predetermined time while the wearable electronic apparatus is operated in the different operation mode, controlling the different operation mode to return to the ANC mode.

The controlling method further includes: based on the identifying the absence of the user's voice while the wearable electronic apparatus is operated in the ANC mode, controlling the ANC mode to be maintained.

The controlling method further includes: based on the presence of the user's voice being identified within the predetermined time while the wearable electronic apparatus is operated in the different operation mode, controlling the different operation mode to be maintained.

The identifying the presence or the absence of the user's voice while the wearable electronic apparatus is operated in the ANC mode further includes: identifying a probability indicating whether the user's voice exists in a plurality of frame units, respectively, that are included in the bone conduction signal, wherein the bone conduction signal is split into the plurality of frame units each having a predetermined duration; and identifying a frame unit among the plurality of frame units, as a current frame in which the user's voice exists based on the identifying that the probability for the frame unit has a predetermined value or more.

The controlling the operation mode to be the different operation mode further includes: identifying whether the current frame corresponds to a humming based on the identifying that the user's voice exists in the current frame; and based on the identifying that the current frame does not correspond to the humming, controlling the operation mode of the wearable electronic apparatus to be the different operation mode from the ANC mode.

The controlling method further includes: based on the identifying that the current frame corresponds to the humming, controlling the operation mode of the wearable electronic apparatus to be maintained as the ANC mode.

The different operation mode includes a normal operation mode in which an external noise is output as is, an AMBIENT mode in which the external noise is emphasized, and a Noise Focusing mode in which an external voice is emphasized.

The controlling the operation mode to be the different operation mode further includes: based on the identifying that the user's voice exists in the current frame, identifying a noise level of the current frame by using a microphone; and controlling the operation mode of the wearable electronic apparatus to be the Noise Focusing mode based on the noise level being identified to have a predetermined value or more.

The controlling method further includes: controlling the operation mode of the wearable electronic apparatus to be the AMBIENT mode based on the noise level being identified to have a value less than the predetermined value.

In accordance with an aspect of the disclosure, there is provided a wearable electronic apparatus worn on user's ears. The wearable electronic apparatus includes: a memory configured to store at least one instruction; an inertial measurement unit (IMU) sensor; and a processor which is, by executing the at least one instruction stored in the memory, configured to control the IMU sensor to receive a bone conduction signal corresponding to vibration generated in the user's face while the wearable electronic apparatus is operated in an active noise cancellation (ANC) mode, identify a presence or an absence of the user's voice based on the bone conduction signal while the wearable electronic apparatus is operated in the ANC mode, based on the identifying the presence of the user's voice while the wearable electronic apparatus is operated in the ANC mode, control an operation mode of the wearable electronic apparatus to be a different operation mode from the ANC mode, while the wearable electronic apparatus is operated in the different operation mode, identify a presence or an absence of the user's voice based on the bone conduction signal, and based on the absence of the user's voice being identified for a predetermined time while the wearable electronic apparatus is operated in the different operation mode, control the different operation mode to return to the ANC mode.

The processor is further configured to, based on the identifying the absence of the user's voice while the wearable electronic apparatus is operated in the ANC mode, control the ANC mode to be maintained.

The processor is further configured to, based on the presence of the user's voice being identified within the predetermined time while the wearable electronic apparatus is operated in the different operation mode, control the different operation mode to be maintained.

The processor is further configured to identify a probability indicating whether the user's voice exists in a plurality of frame units, respectively, that are included in the bone conduction signal, wherein the bone conduction signal is split into the plurality of frame units each having a predetermined duration, and identify a frame unit among the plurality of frame units, as a current frame in which the user's voice exists based on the identifying that the probability for the frame unit has a predetermined value or more.

The processor is further configured to identify whether the current frame corresponds to a humming based on the identifying that the user's voice exists in the current frame, and based on the identifying that the current frame does not correspond to the humming, control the operation mode of the wearable electronic apparatus to be the different operation mode from the ANC mode.

The processor is further configured to, based on the identifying that the current frame corresponds to the humming, control the operation mode of the wearable electronic apparatus to be maintained as the ANC mode.

In accordance with an aspect of the disclosure, there is provided anon-transitory computer-readable storage medium storing at least one instruction which, when executed by a processor of a wearable electronic apparatus, causes the processor to execute a method including: receiving, by an inertial measurement unit sensor of the wearable electronic apparatus, a bone conduction signal corresponding to vibration generated in the user's face, while the wearable electronic apparatus is operated in an active noise cancellation (ANC) mode; identifying a presence or an absence of the user's voice based on the bone conduction signal while the wearable electronic apparatus is operated in the ANC mode; based on the identifying the presence of the user's voice while the wearable electronic apparatus is operated in the ANC mode, controlling an operation mode of the wearable electronic apparatus to be a different operation mode from the ANC mode; while the wearable electronic apparatus is operated in the different operation mode, identifying a presence or an absence of the user's voice based on the bone conduction signal; and based on the absence of the user's voice being identified for a predetermined time while the wearable electronic apparatus is operated in the different operation mode, controlling the different operation mode to return to the ANC mode.

The method executed by the processor further includes: based on the identifying the absence of the user's voice while the wearable electronic apparatus is operated in the ANC mode, controlling the ANC mode to be maintained.

The method executed by the processor further includes: based on the presence of the user's voice being identified within the predetermined time while the wearable electronic apparatus is operated in the different operation mode, controlling the different operation mode to be maintained.

In the identifying the presence or the absence of the user's voice while the wearable electronic apparatus is operated in the ANC mode, the method executed by the processor further includes: identifying a probability indicating whether the user's voice exists in a plurality of frame units, respectively, that are included in the bone conduction signal, wherein the bone conduction signal is split into the plurality of frame units each having a predetermined duration; and identifying a frame unit among the plurality of frame units, as a current frame in which the user's voice exists based on the identifying that the probability for the frame unit has a predetermined value or more.

In the controlling the operation mode to be the different operation mode, the method executed by the processor further includes: identifying whether the current frame corresponds to a humming based on the identifying that the user's voice exists in the current frame, and based on the identifying that the current frame does not correspond to the humming, controlling the operation mode of the wearable electronic apparatus to be the different operation mode from the ANC mode.

The method executed by the processor further includes: based on the identifying that the current frame corresponds to the humming, controlling the operation mode of the wearable electronic apparatus to be maintained as the ANC mode.

Advantageous Effects

According to embodiments, the wearable electronic apparatus may provide the operation mode based on the user's dialog situation, thereby having improved convenience.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, the disclosure is described in detail with reference to the accompanying drawings.

Figure 1:
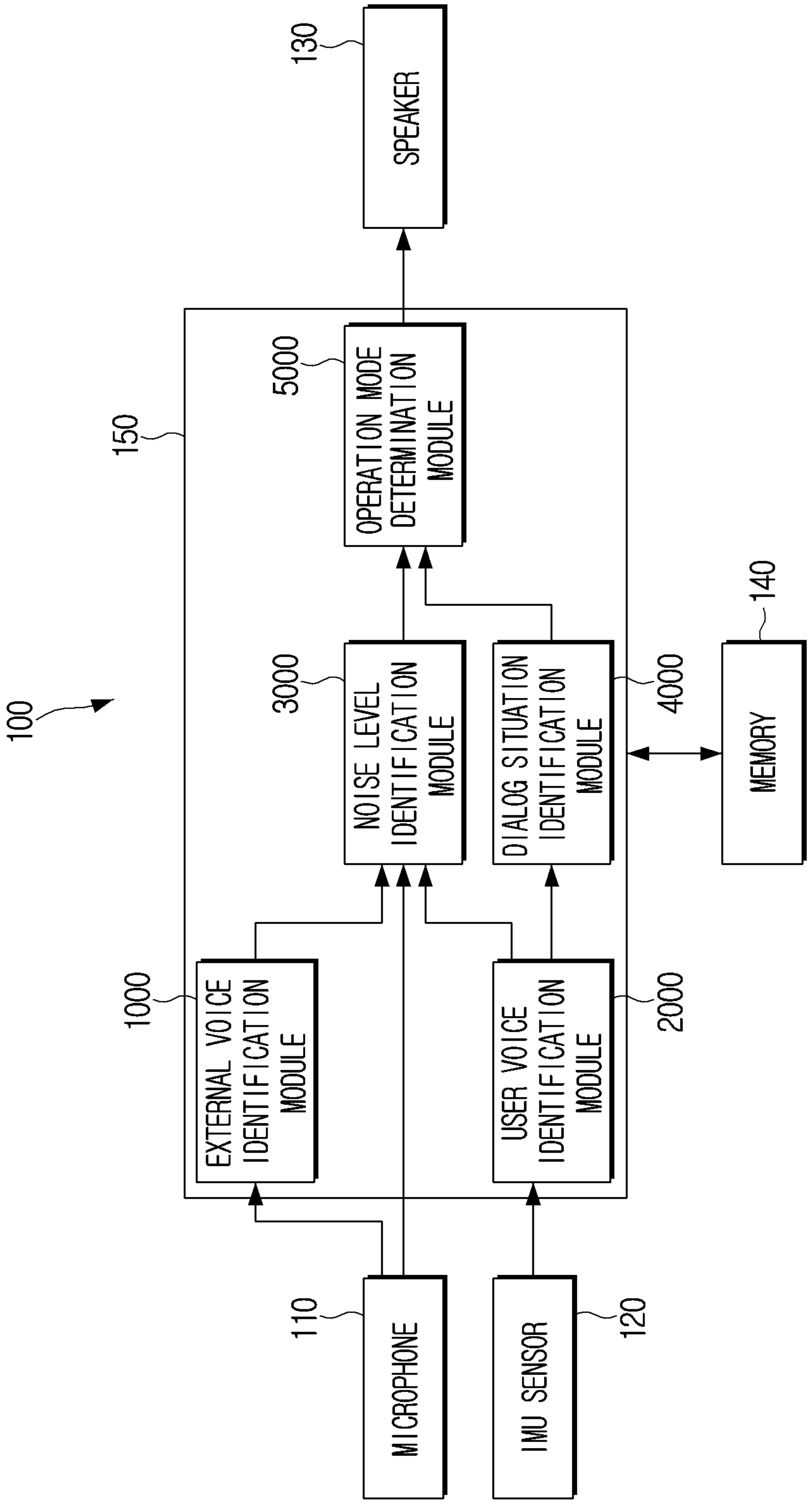
FIG. 1 is a block diagram showing a configuration of an wearable electronic apparatus according to an embodiment.

FIG. 1 is a block diagram showing a configuration of a wearable electronic apparatus 100 according to an embodiment.

Referring to FIG. 1, the wearable electronic apparatus 10 may include a microphone 110, an IMU sensor 120, a speaker 130, a memory 140 and a processor 150. The wearable electronic apparatus 100 according to an embodiment may be implemented as various wearable electronic apparatuses such as wireless earphones, wired earphones and a headset worn on user's ears. In addition, two wearable electronic apparatuses 100 may be implemented to be each worn on the user's ears.

The microphone 110 may be configured to receive noise around the wearable electronic apparatus. In detail, the microphone 110 may use a microphone to receive the noise around the wearable electronic apparatus 100 and convert the received noise into an electrical data signal. In this case, the microphone 110 may transmit the converted data signal to the processor 150.

In an embodiment, the microphone 110 may include an external microphone 112 disposed on the wearable electronic apparatus 100 to be positioned outside the user's ear. The external microphone may be disposed to be positioned outside the user's ear, and configured to receive the external noise.

In addition, the wearable electronic apparatus 100 may further include an internal microphone 160. The internal microphone may be positioned inside the user's ear, and configured to receive the user's spoken voice. For example, two external microphones may be implemented, and one internal microphone may be implemented. However, an embodiment is not limited thereto, and the various numbers of external microphones and internal microphones may be implemented.

The IMU sensor 120 may be configured to receive a bone conduction signal corresponding to vibration generated in the user's face. That is, the IMU sensor 120 may receive information on the vibration generated from the user's skin or bone and convert the received vibration into a waveform signal. In this case, the IMU sensor 120 may transmit the converted waveform signal to the processor 150. For example, the IMU sensor 120 may include an acceleration sensor capable of measuring the bone conduction signal. However, an embodiment is not limited thereto, and may include various sensors capable of measuring the bone conduction signal.

For example, if the wearable electronic apparatus 100 is worn on the user's ear, the IMU sensor 120 may be positioned in the wearable electronic apparatus 100 to be inserted in the user's ear canal. In addition, the IMU sensor 120 may receive the bone conduction signal conducted by the user's skin or bone. However, an embodiment is not limited thereto, and the IMU sensor 120 may be disposed to be in contact with an outer housing of the wearable electronic apparatus 100 that is inserted in the user's ear canal.

Figure 2:
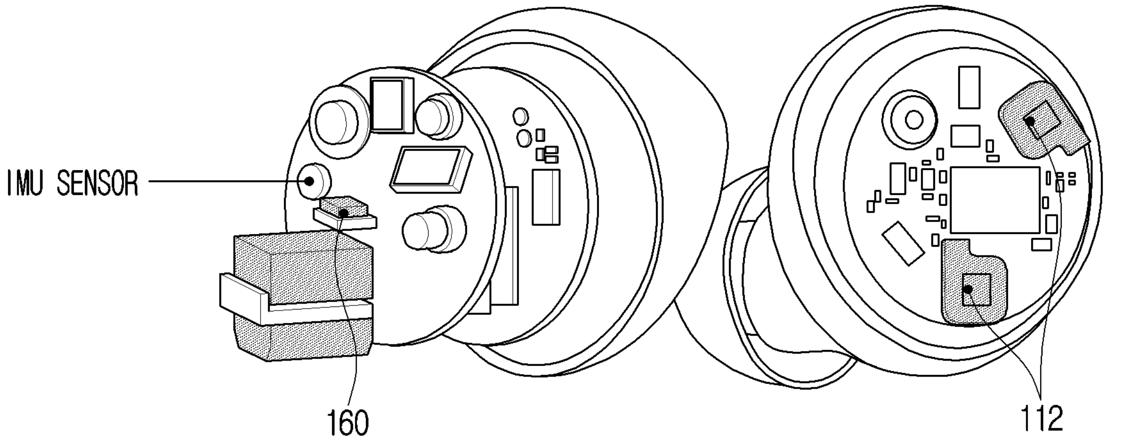
FIG. 2 is a diagram showing the positions of an IMU sensor, an internal microphone and an external microphone in a wearable electronic apparatus 100 according to an embodiment.

FIG. 2 is a diagram showing the positions of an IMU sensor, an internal microphone and an external microphone in a wearable electronic apparatus 100 according to an embodiment. Referring to FIG. 2, in case that the wearable electronic apparatus 100 is worn on the user's ear, the internal microphone and the IMU sensor 120 may be configured to be positioned inside the user's ear canal. In addition, the external microphone 112 may be configured to be positioned outside the user's ear in case that the wearable electronic apparatus 100 is worn on the user's ear.

The speaker 130 is configured to output audio data. The speaker 130 according to an embodiment may output audio data from which the external noise is canceled or blocked (ANC mode), or output audio data in which the external noise is emphasized (AMBIENT mode), based on various operation modes of the wearable electronic apparatus 100. It is possible to output audio data in a normal operation mode in which external noise is output to the speaker as it is, not in the ANC mode or in the AMBIENT mode.

The memory 140 may store at least one instruction or data related to at least one another component of the wearable electronic apparatus 100. In particular, the memory 140 may be implemented as a non-volatile memory, a volatile memory, a flash memory, a hard disk drive (HDD), a solid state drive (SDD), etc. The memory 140 may be accessed by the processor 150, and the processor 150 may perform readout, recording, correction, deletion, update and the like of data therein.

In an embodiment, the term memory may include the memory 140, a read only memory (ROM, not shown) and a random access memory (RAM, not shown) in the processor 150, or a memory card (not shown) mounted on the wearable electronic apparatus 100 (e.g., micro secure digital (SD) card or memory stick).

As described above, the memory 140 may store at least one instruction. Here, the instruction may be for controlling the wearable electronic apparatus 100. For example, the memory 140 may store the instruction related to a function changing an operation mode based on a user's dialog situation. In detail, the memory 140 may include a plurality of components (or modules) changing the operation mode based on the user's dialog situation according to an embodiment, which is described below.

The processor 150 may be electrically connected to the memory 140 and may control the overall operation and function of the wearable electronic apparatus 100. In particular, the processor 150 may provide an operation mode change function changing the operation mode based on the user's dialog situation. As shown in FIG. 1, the operation mode change function according to an embodiment may include an external voice identification module 1000, a user voice identification module 2000, a noise level identification module 3000, a dialog situation identification module 4000 and an operation mode determination module 5000, and each module may be stored in the memory 140.

In addition, a plurality of modules 1000 through 5000 may be loaded into the memory (e.g., volatile memory) included in the processor 150 to perform the operation mode change function. That is, in order to perform the operation mode change function, the processor 150 may load the plurality of modules 1000 through 5000 from the non-volatile memory to the volatile memory, and then execute respective functions of the plurality of modules 1000 through 5000. Loading may indicate an operation of loading and storing data stored in the non-volatile memory into the volatile memory for the processor 150 to access the data.

In an embodiment, the operation mode change function am be implemented by the plurality of modules 1000 through 5000 stored in the memory 140 as shown in FIG. 1. However, an embodiment is not limited thereto, and the operation mode change function may be implemented by an external apparatus connected to the wearable electronic apparatus 100.

The plurality of modules 1000 through 5000 according to an embodiment may be each implemented in software. However, an embodiment is not limited thereto, and some modules may be implemented as a combination of hardware and software. In another embodiment, the plurality of modules 1000 through 5000 may be implemented as a single software module. In addition, some modules may be implemented in the wearable electronic apparatus 100, while others may be implemented in an external apparatus.

The external voice identification module 1000 is configured to identify information on an external voice through the microphone 110. In detail, the external voice identification module 1000 may identify whether ambient noise data received by the microphone 110, via the external microphone 112, is the external voice. Here, the external voice may be an external voice which is different from the voice spoken by the user of the wearable electronic apparatus 1X). That is, the external voice may be a voice of a talker performing a speech with the user of the wearable electronic apparatus 100.

In an embodiment, the external voice identification module 1000 may identify whether the external voice is included in a noise signal received by the microphone 110 using a voice activity detection (VAD) technique. The VAD technique is a technique for distinguishing a voice and silence from each other in a noise signal, and may also be referred to as a "speech detection" technique.

In detail, the external voice identification module 1000 may identify whether the external voice is included in each frame of the noise signal using the VAD technique. For example, the external voice identification module 1000 may identify whether or not the external voice exists in the noise signal in a binary manner using the VAD technique.

In addition, if it is identified whether the external voice is included in each frame of the audio data, the external voice identification module 1000 may provide the identified information to the noise level identification module 3000.

The user voice identification module 2000 is configured to identify information on the voice of the user of the wearable electronic apparatus 100 based on the bone conduction signal of the user of the wearable electronic apparatus 100, obtained by the IMU sensor 120.

In detail, the user voice identification module 2000 may identify whether the user's voice is included in each frame of the bone conduction signal using a wearer speech detection (WSD) technique which uses the user's bone conduction signal obtained by the IMU sensor 120. The wearer speech detection (WSD) technique is a technique for obtaining a probability whether a voice exists in a frequency domain of the bone conduction signal based on energy of each frequency band. In detail, it is possible to estimate a noise spectrum of the bone conduction signal, and analyze the gain and signal to noise ratio (SNR) for the estimated spectrum, thereby identifying the probability whether the voice exists in each frame of the bone conduction signal. The user voice identification module 2000 may identify the probability whether the voice exists in each frame of the bone conduction signal by distinguishing a stationary voice signal and a non-stationary voice signal from each other in the bone conduction signal using the WSD technique.

In an embodiment, the user voice identification module 2000 may identify the probability whether the user's voice exists in each frame having a predetermined interval, e.g., a duration, by dividing the bone conduction signal into a plurality of frame units having the predetermined frame intervals, e.g., durations, (e.g., frame intervals of 10 ms). For example, the user voice identification module 2000 may identify the frame unit in which the probability that the voice exists has a predetermined value (e.g., 0.7) or more as the frame including the voice, e.g., a current frame including the voice.

The description describes the WSD technique which uses the user's bone conduction signal obtained by the IMU sensor 120 below with reference to FIG. 3.

If it is identified that the probability whether the user's voice exists in the bone conduction signal, the user voice identification module 2000 may provide the identified probability whether the user's voice exists in each frame of the bone conduction signal to the noise level identification module 3000 and the dialog situation identification module 4000.

The noise level identification module 3000 is configured to identify an external noise level. In detail, the noise level identification module 3000 may identify the noise level except for the voice, based on: information on whether the external voice exists, which is provided by the external voice identification module 1000; information on the probability whether the user's voice exists, which is provided by the user voice identification module 2000; and the noise signal received from the microphone 110. That is, among the noise signal received from the microphone 110, the noise level identification module 3000 may identify the noise level of the other frame except: the frame identified as including the external voice by the external voice identification module 1000; and the frame identified as including the probability that the user's voice exists therein based on the predetermined value (e.g., 0.7) or more by the user voice identification module 2000.

In an embodiment, the noise level identification module 3000 may calculate the noise level with low complexity by using the lowest sampling frequency in a range including the maximum attenuation frequency. A method of calculating the noise level is described below with reference to FIG. 4.

In an embodiment, the operation mode change function according to an embodiment may be implemented without the operation of the external voice identification module 1000. That is, among the noise signal received from the microphone 110, the noise level identification module 3000 may identify the noise level of the other frame except the frame having the probability that the user's voice exists therein based on the predetermined value (e.g., 0.7) or more, obtained by the user voice identification module 2000.

The dialog situation identification module 4000 is configured to identify whether a current situation is the dialog situation based on information on the probability whether the user's voice exists, provided by the user voice identification module 2000.

In an embodiment, the dialog situation identification module 4000 may identify whether the current situation is the dialog situation using only the information on the probability whether the user's voice exists, which is obtained by the user voice identification module 2000. In detail, in case that the frame identified as including the voice has the predetermined frame duration (e.g., frame duration of 500 ms) or more, based on the information on the probability that the user's voice exists, the dialog situation identification module 4000 may identify that the user has a dialog in the frame.

In addition, in case that the frame identified as including the voice has a frame duration less than the predetermined frame duration (e.g., less than 500 ms), based on the information on the probability that the user's voice exists, the dialog situation identification module 4000 may identify that the user simply makes an exclamation in the frame. That is, the dialog situation identification module 400) may identify that the user has no dialog in the frame.

However, an embodiment is not limited thereto. It is assumed that the user's voice is simply the user's humming even though it is identified that the frame identified as including the voice has the predetermined frame interval (frame interval of 500 ms). In this case, the dialog situation identification module 4000 may identify that the frame is the frame of a humming situation and not the frame of the dialog situation. For example, the dialog situation identification module 4000 may identify whether the user's voice is humming using a signal feature extraction technique. In detail, the dialog situation identification module 4000 may identify whether the user's voice is the humming by analyzing energy of the bone conduction signal. In addition, the dialog situation identification module 4000 may identify the frame identified as including the humming made by the user as that of the humming situation, and may thus identify that the user has no dialog.

For example, the dialog situation identification module 400) may identify the frame as that of the humming situation by identifying that the user makes the humming in the frame in case that a ratio between high-band energy and low-band energy has a value less than a predetermined value using a difference between the high-band energy and the low-band energy for each frame of the bone conduction signal.

For example, the dialog situation identification module 4000 may identify whether the user's voice is the humming by further using a zero crossing rate, which represents the periodic frequency of a waveform for each frame of the bone conduction signal.

That is, the humming may include a voiced sound accompanying the vibration of a vocal cord, and the dialog situation identification module 400) may thus identify the frame as that of the humming situation by identifying that the user makes the humming in the frame in case that a ratio of a frame size and the zero crossing rate for each frame of the bone conduction signal (zero crossing rate/frame size) has a value less than a predetermined value.

In addition, the dialog situation identification module 4000 may identify the frame as that of the humming situation by using both the difference between the high-band energy and the low-band energy for each frame of the bone conduction signal and the zero crossing rate for each frame of the bone conduction signal.

In addition, the dialog situation identification module 4000 may identify a start point of the identified frame as a dialog start point in case that the frame identified as including the dialog made by the user exists in the bone conduction signal.

In addition, the dialog situation identification module 4000 may identify a dialog end point after the dialog start point. In detail, the dialog situation identification module 4000 may identify the dialog end point depending on whether the user is identified as having a dialog again within a predetermined time (e.g., five seconds) from a point where the user's voice ends, after the dialog start point. That is, the dialog situation identification module 4000 may identify the dialog situation as continuing after the dialog start point in case that the user is identified as having the dialog within the predetermined time (e.g., five seconds) from the point where the user's voice ends, after the dialog start point. In addition, the dialog situation identification module 4000 may identify that the dialog is over in case that the user's dialog is not identified within the predetermined time (e.g., five seconds) from the point where the user's voice ends. Here, the predetermined time may be five seconds, but is not limited thereto, and may be determined or changed by the user or manufacturer of the wearable electronic apparatus 100 such as three seconds, seven seconds, nine seconds, etc.

The operation mode determination module 5000 is configured to determine the operation mode based on the external noise level identified by the noise level identification module 3000 and the dialog situation identified by the dialog situation identification module 4000.

In detail, the operation mode may include the ANC mode, the AMBIENT mode and the normal operation mode. However, the operation mode is not limited thereto, and may be implemented to only include the ANC mode and the AMBIENT mode.

In addition, the operation mode may further include an operation mode different from the ANC mode, the AMBIENT mode and the normal operation mode. For example, the operation mode may further include a Noise Focusing mode controlling the operation mode to be the ANC mode for a low frequency band and the AMBIENT mode for a high frequency band. While being operated in the Noise Focusing mode, the wearable electronic apparatus 100 may be operated to control the external noise corresponding to the low frequency band to be canceled and a voice corresponding to the high frequency band to be emphasized.

The ANC mode is a mode for outputting the audio data from which the external noise is canceled or blocked. The AMBIENT mode is a mode for outputting the audio data in which the external noise is emphasized. The normal operation mode is a mode for outputting the audio data as is without emphasizing or blocking the external noise.

In an embodiment, the operation mode determination module 5000 may control the operation mode of the wearable electronic apparatus 100 to be the AMBIENT mode if the current situation is identified as the dialog situation by the dialog situation identification module 4000. In addition, if the dialog is identified as being over, the operation mode determination module 5000 may control the operation mode to return to an original operation mode if the dialog is identified as being over. For example, the operation mode determination module 5000 may control the operation mode of the wearable electronic apparatus 100 to be the AMBIENT mode if the user is identified as having the dialog while the wearable electronic apparatus 100 is operated in the ANC mode. In addition, the operation mode determination module 5000 may control the operation mode of the wearable electronic apparatus 100 to return to the ANC mode if the dialog is identified as being over while the wearable electronic apparatus 100 is operated in the AMBIENT mode.

In an embodiment, the operation mode determination module 5000 may control the operation mode of the wearable electronic apparatus 100 to be the ANC mode if the noise level is identified as having a predetermined value (e.g., 80 dB) or more by the noise level identification module 3000. In addition, the operation mode determination module 5000 may control the operation mode of the wearable electronic apparatus 100 to return to the original operation mode if the noise level is identified as having a value lower than the predetermined value (e.g., 80 dB) while the wearable electronic apparatus 100 is operated in the ANC mode. For example, the operation mode determination module 5000 may control the operation mode of the wearable electronic apparatus 100 to be the ANC mode if the noise level is identified as having the predetermined value (e.g., 80 dB) or more while the wearable electronic apparatus 100 is operated in the normal operation mode. In addition, the operation mode determination module 5000 may control the operation mode of the wearable electronic apparatus 100 to return to the normal operation mode if the noise level is identified as having the value less than the predetermined value (e.g., 80 dB) while the wearable electronic apparatus 100 is operated in the ANC mode.

In an embodiment, the operation mode change function may be implemented without the operation of the external voice identification module 1000. In this case, the noise level identification module 3000 may identify the noise level of the other frame except the frame identified as including the user's voice by the user voice identification module 2000. In addition, the operation mode determination module 5000 may control the operation mode of the wearable electronic apparatus 100 based on the noise level obtained by the noise level identification module 3000 and the dialog situation obtained by the user voice identification module 2000. In detail, the operation mode determination module 5000 may control the operation mode of the wearable electronic apparatus 100 as shown in Tables 1, 2 and 3.

TABLE 1

| No | ANC status | dialog situation | noise level | operation node (ANC-AMBIENT) |
|---|---|---|---|---|
| 1 | 1 | 1 | 1 | ANC -> AMBIENT -> ANC |
| 2 | 1 | 1 | 0 | ANC -> AMBIENT -> ANC |
| 3 | 1 | 0 | 1 | ANC maintained |
| 4 | 1 | 0 | 0 | ANC maintained |
| 5 | 0 | 1 | 1 | AMBIENT maintained |
| 6 | 0 | 1 | 0 | AMBIENT maintained |
| 7 | 0 | 0 | 1 | AMBIENT -> ANC -> AMBIENT |
| 8 | 0 | 0 | 0 | AMBIENT maintained |

Table 1 is a table showing a method to control the operation mode in case that two operation modes, i.e., ANC mode and AMBIENT mode, are implemented according to an embodiment. Referring to Table 1, situation nos. 1, 2, 3 and 4 may each indicate a case of an operation in the ANC mode (ANC status=1), and situation nos. 5, 6, 7 and 8 may each indicate a case of no operation in the ANC mode (ANC status=0), i.e. operation in the AMBIENT mode.

In addition, a case where "dialog situation=1" may indicate the dialog situation, and a case where "dialog situation=0" may indicate no dialog situation, which are identified by the dialog situation identification module 4000.

In addition, a case where "noise level=1" may indicate a case where the noise level has the predetermined value (e.g., 80 dB) or more, and a case where "noise level=0" may indicate a case where the noise level has the value less than the predetermined value (e.g., 80 dB), which are identified by the noise level identification module 3000.

Referring to Table 1, situation no. 1 may indicate a case where the dialog situation is detected during the operation in the ANC mode. In this case, the operation mode determination module 5000 may change the operation mode from the ANC mode to the AMBIENT mode, and may then control the operation mode to return to the ANC mode again if the dialog situation is detected as being over.

In addition, situation no. 5 may indicate a case where the noise level is identified as having the predetermined value or more and the dialog situation is detected during the operation in the AMBIENT mode. In this case, the operation mode determination module 5000 may control the operation mode to be maintained in the AMBIENT mode.

In addition, situation no. 7 may indicate a case where the noise level is identified as having the predetermined value or more during the operation in the AMBIENT mode. In this case, the operation mode determination module 5000 may change the operation mode from the AMBIENT mode to the ANC mode, and may then control the operation mode to return to the AMBIENT mode again if the noise level is identified as having a value less than the predetermined value.

TABLE 2

| No | ANC status | dialog situation | noise level | operation mode (ANC-AMBIENT-noise focusing) |
|---|---|---|---|---|
| 1 | 1 | 1 | 1 | ANC -> Noise Focusing -> ANC |
| 2 | 1 | 1 | 0 | ANC -> AMBIENT -> ANC |
| 3 | 1 | 0 | 1 | ANC maintained |
| 4 | 1 | 0 | 0 | ANC maintained |
| 5 | 0 | 1 | 1 | AMBIENT -> Noise Focusing -> AMBIENT |
| 6 | 0 | 1 | 0 | AMBIENT maintained |
| 7 | 0 | 0 | 1 | AMBIENT -> ANC ->AMBIENT |
| 8 | 0 | 0 | 0 | AMBIENT maintained |

Table 2 is a table showing a method to control the operation mode in case that three operation modes, i.e., ANC mode, AMBIENT mode and Noise Focusing mode, are implemented according to an embodiment. Referring to Table 2, situation no. 1 may indicate a case where the dialog situation is detected during the operation in the ANC mode, and the noise level is identified as having the predetermined value or more. In this case, the operation mode determination module 5000 may change the operation mode from the ANC mode to the Noise Focusing mode, and may then control the operation mode to return to the ANC mode again if the dialog situation is detected as being over.

Referring to Table 2, situation no. 5 may indicate a case where the noise level is identified as having the predetermined value or more and the dialog situation is detected during the operation in the AMBIENT mode. In this case, the operation mode determination module 5000 may control the operation mode to be changed from the AMBIENT mode to the Noise Focusing mode and may then control the operation mode to return to the AMBIENT mode again if the dialog situation is detected as being over. However, the operation mode determination module 5000 is not limited thereto. The operation mode determination module 5000 may control the operation mode to be changed from the Noise Focusing mode to the ANC mode if the dialog situation is detected as being over, and the noise level is continuously identified as having the predetermined value or more, after the operation mode is changed from the AMBIENT mode to the Noise Focusing mode.

TABLE 3

| No | ANC status | dialog situation | noise level | operation mode (ANC-AMBIENT-normal operation mode) |
|---|---|---|---|---|
| 1 | 1 | 1 | 1 | ANC -> AMBIENT -> ANC |
| 2 | 1 | 1 | 0 | ANC -> AMBIENT -> ANC |
| 3 | 1 | 0 | 1 | ANC maintained |

TABLE 3-continued

| No | ANC status | dialog situation | noise level | operation mode (ANC-AMBIENT-normal operation mode) |
|---|---|---|---|---|
| 4 | 1 | 0 | 0 | ANC maintained |
| 5 | 0 | 1 | 1 | AMBIENT (or normal operation) -> AMBIENT -> ANC |
| 6 | 0 | 1 | 0 | AMBIENT (or normal operation) -> AMBIENT ->AMBIENT (or normal operation) |
| 7 | 0 | 0 | 1 | AMBIENT (or normal operation) -> ANC |
| 8 | 0 | 0 | 0 | AMBIENT (or normal operation) maintained |

Table 3 is a table showing a method to control the operation mode in case that three operation modes, i.e., ANC mode, AMBIENT mode and normal operation mode, are implemented according to an embodiment. Referring to Table 3, situation no. 5 may indicate a case where the noise level is identified as having the predetermined value or more and the dialog situation is detected during the operation in the AMBIENT mode or in the normal operation mode. In this case, the operation mode determination module 5000 may control the operation mode to be changed from the AMBIENT mode or the normal operation mode to the ANC mode. In addition, the operation mode determination module 5000 may control the operation mode to be changed from the AMBIENT mode to the ANC mode if the dialog situation is detected as being over, and the noise level is continuously identified as having the predetermined value or more.

According to the various embodiments described above, the wearable electronic apparatus 100 may have the changed operation mode based on the user's dialog situation and the noise level.

Figure 3:
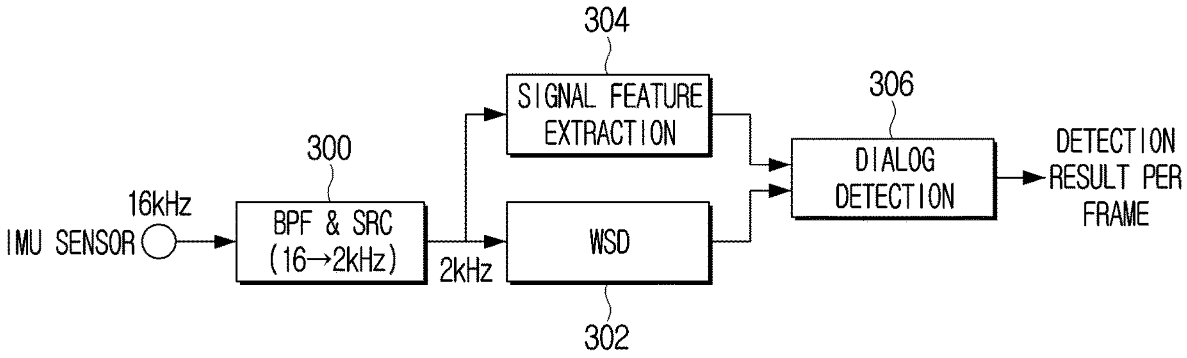
FIG. 3 is a diagram showing a method of identifying a dialog situation according to an embodiment.

FIG. 3 is a diagram showing a method of identifying a dialog situation according to an embodiment.

In an embodiment, the wearable electronic apparatus 100 may pre-process the bone conduction signal received by the IMU sensor 120 and convert the signal into a signal in a 2 kHz band (operation 300). For example, the wearable electronic apparatus 100 may convert the bone conduction signal in a 16 kHz band into the signal in the 2 kHz band by using a band-pass filter (BPF) and a sampling rate conversion (SRC). In addition, the wearable electronic apparatus 100 may identify the probability whether the user's voice exists in each frame of the signal based on the signal in the 2 kHz band converted using the WDS (operation 302). In an embodiment, the wearable electronic apparatus 100 may identify the probability whether the voice exists in each frame unit having the predetermined interval (e.g., frame interval of 10 ms) among the plurality of frames of the signals in the 2 kHz band.

In an embodiment, the user voice identification module 2000 of FIG. 1 may identify the probability whether the user's voice exists in each frame of the signal using the BPF, the SRC and the WDS.

In addition, the wearable electronic apparatus 100 may extract a parameter for detecting the humming by performing the signal feature extraction on the converted 2 kHz band signal (operation 304). That is, the wearable electronic apparatus 100 may identify whether the user's voice is the humming by analyzing the energy of the signal in the 2 kHz band, as described in FIG. 1. In an embodiment, the dialog situation identification module 4000 of FIG. 1 may identify whether a current frame is the humming situation using the signal feature extraction.

In addition, the wearable electronic apparatus 100 may identify whether the dialog situation exists in each frame of the signal (dialog detection) based on the probability whether the user's voice exists in each frame of the signal obtained by the WSD and the information on whether the user's voice obtained by the signal feature extraction is the humming (operation 306). For example, the wearable electronic apparatus 100 may identify the other frame except the frame identified as that of the humming situation as the frame corresponding to the dialog situation among the frames of the signals, having the probability that the user's voice exists therein based on the predetermined value (e.g., 0.7) or more, using the signal feature extraction. For example, the operation mode determination module 5000 of FIG. 1 may identify whether the dialog situation exists in each frame of the signal. In addition, the wearable electronic apparatus 100 may identify the dialog start point and the dialog end point based on the information on whether the dialog situation exists in each frame of the signal.

Figure 4:
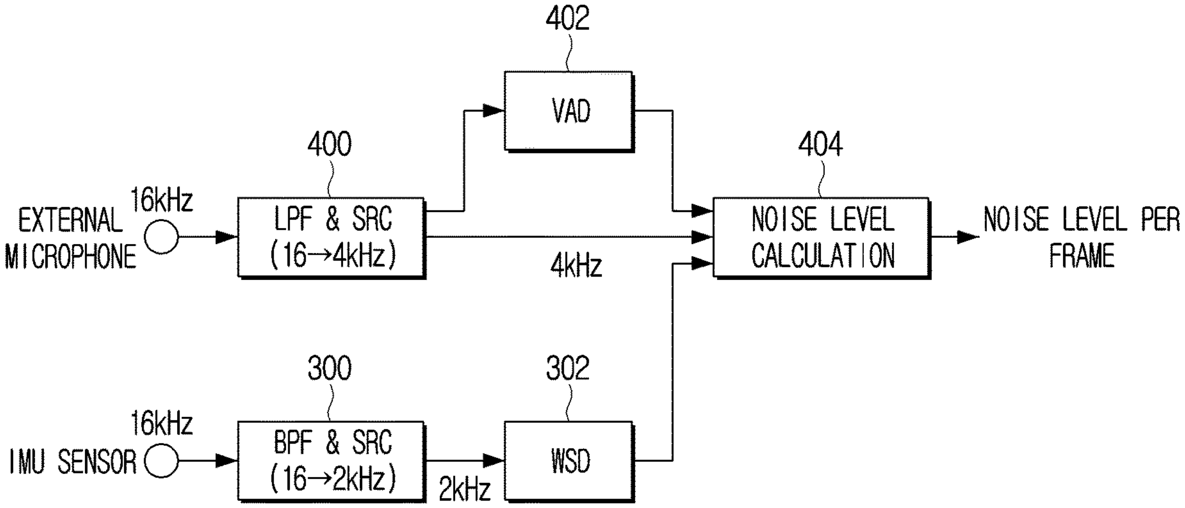
FIG. 4 is a diagram showing a method of identifying a noise level according to an embodiment.

FIG. 4 is a diagram showing a method of identifying a noise level according to an embodiment.

In an embodiment, the wearable electronic apparatus 100 may pre-process the audio signal received by the microphone 110 and convert the signal into a signal in a 4 kHz band (operation 400). For example, the wearable electronic apparatus 100 may convert the audio signal in a 16 kHz band into the signal in the 4 kHz band by using a low-pass filter (LPF) and the SRC.

In addition, the wearable electronic apparatus 100 may identify whether the external voice exists in each frame of the signal, based on the signal in the 4 kHz band converted using the VAD (operation 402). In an embodiment, the wearable electronic apparatus 100 may identify whether the external voice exists in each frame having the predetermined interval (e.g., frame interval of 10 ms) among the plurality of frames of the signals in the 4 kHz band. In an embodiment, the external voice identification module 1000 of FIG. 1 may identify whether the external voice exists in each frame having the predetermined interval (e.g., frame interval of 10 ms) by using the VAD.

In addition, the wearable electronic apparatus 100 may identify the noise level of each frame (operation 404) based on the information on whether the external voice exists in each frame obtained by the VAD, the converted 4 kHz band signal, and the probability whether the user's voice exists in each frame of signal obtained by the WSD described in FIG. 3.

For example, the wearable electronic apparatus 100 may identify the noise level of the other frame except the frame identified as including the user's voice by the WSD among the plurality of frames based on the signal in the 4 kHz band.

For example, the wearable electronic apparatus 100 may identify the noise level of the other frame except: the frame identified as including the user's voice obtained by the WSD; and the frame identified as including the external voice obtained by the VAD, among the plurality of frames based on the signal in the 4 kHz band. In an embodiment, the noise level identification module 3000 of FIG. 1 may identify the noise level of each frame having the predetermined interval (e.g., frame interval of 10 ms).

Figure 5:
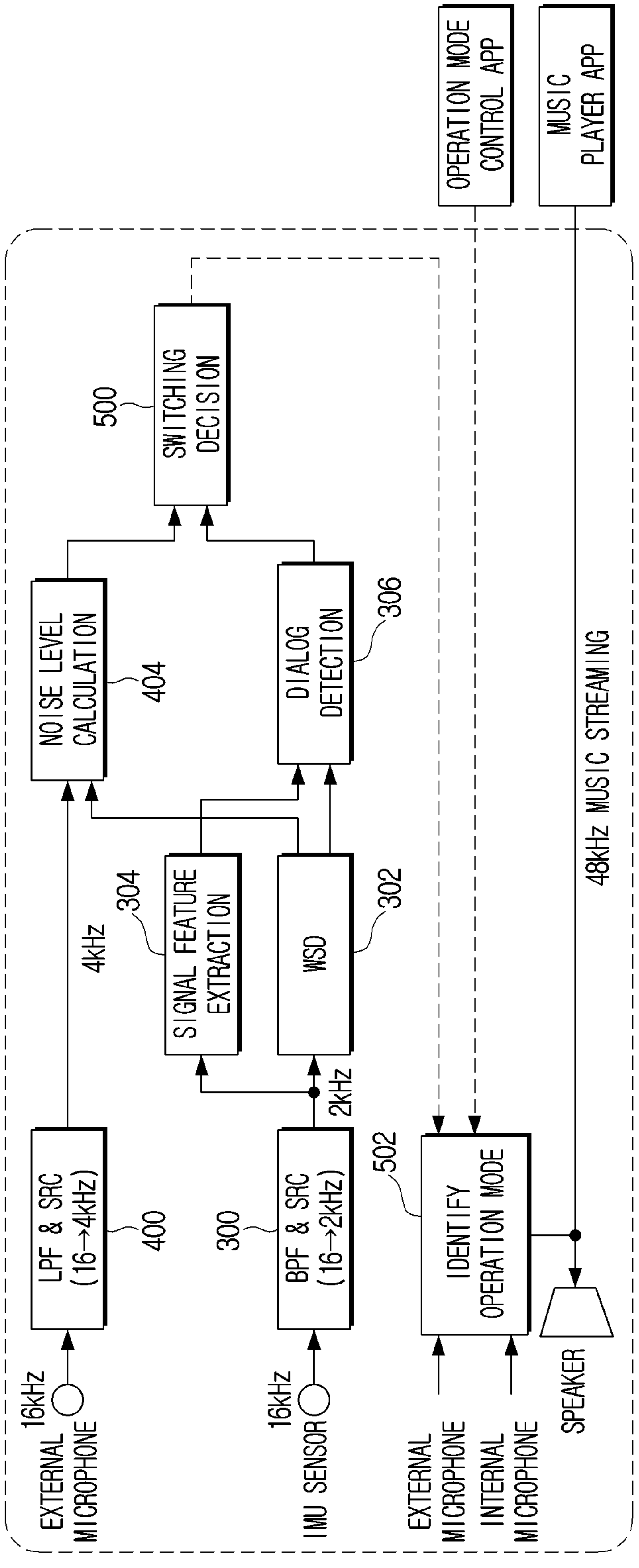
FIG. 5 is a diagram showing a method of determining an operation mode using the IMU sensor according to an embodiment.

FIG. 5 is a diagram showing a method of determining an operation mode using the IMU sensor according to an embodiment.

As described in FIG. 1, in an embodiment, the wearable electronic apparatus 100 may determine its operation mode using the external microphone and the IMU sensor.

In detail, in operation 500, the wearable electronic apparatus 100 may determine whether to change its operation mode (switching decision) using: the information on whether the dialog situation exists in each frame of the signal based on the dialog detection using the IMU sensor, as described in FIG. 3 (e.g., operation 306); and the noise level of each frame of the signal based on noise level calculation using the external microphone and the IMU sensor, as described in FIG. 4 (e.g., operation 404). In detail, the wearable electronic apparatus 100 may determine whether to change its operation mode in the same manner as shown in Tables 1, 2 and 3.

In addition, the operation mode may be controlled by the user of the wearable electronic apparatus 100. For example, the user of the wearable electronic apparatus 100 may change the operation mode using an operation mode control application installed in the wearable electronic apparatus 100.

In addition, the wearable electronic apparatus 100 may identify a result of the switching decision (operation 502) and whether the operation mode is changed in the operation mode control application, and may generate a signal to cancel the noise included in the audio signal received by the external microphone and the internal microphone based on the operation mode and provide the generated signal to the speaker.

For example, in case that music is played through a music player application while being operated in the ANC mode, the wearable electronic apparatus 100 may control the signal to cancel the audio signal received by the external microphone to be generated, and may control the generated signal to be output to the speaker together with the music.

Figure 6:
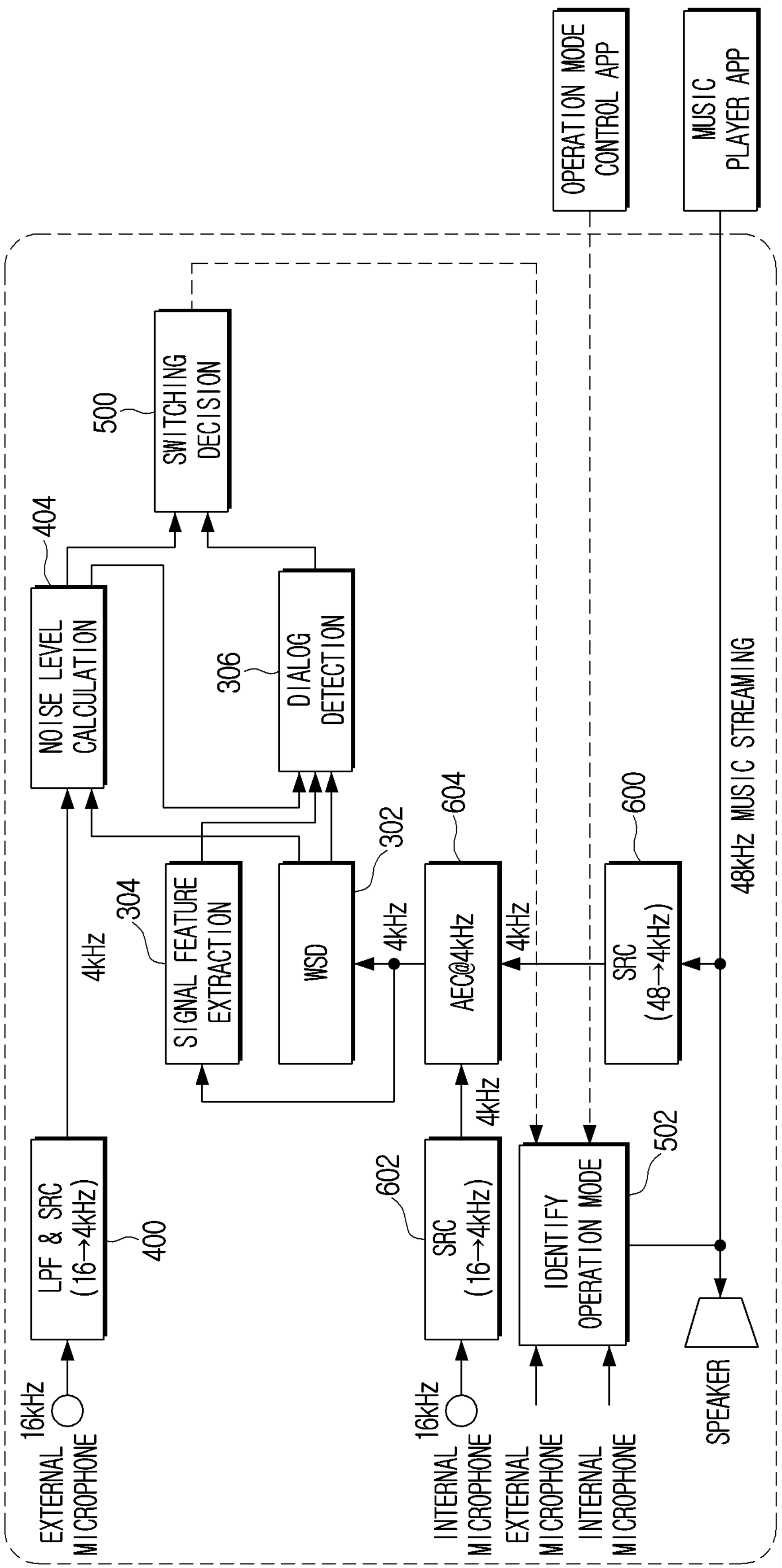
FIG. 6 is a diagram showing a method of determining the operation mode using an internal microphone according to an embodiment.

FIG. 6 is a diagram showing a method of determining the operation mode using an internal microphone according to an embodiment.

In an embodiment, the wearable electronic apparatus 100 may determine its operation mode using the external microphone and the internal microphone.

In an embodiment, the wearable electronic apparatus 100 may identify whether the dialog situation exists in each frame of the signal by using the internal microphone without using the IMU sensor. In detail, the wearable electronic apparatus 100 may convert music audio data in a 48 kHz band received by the internal microphone into the signal in the 4 kHz band using the SRC (operation 600). In addition, the wearable electronic apparatus 100 may convert audio data in a 16 kHz band (e.g., users voice) except for the music audio data received by the internal microphone into the signal in the 4 kHz band using the SRC (operation 602). In addition, the wearable electronic apparatus 100 may remove an echo from the converted 4 kHz band signal by using acoustic echo canceling (AEC) (operation 604), and may identify the probability whether the user's voice exists in each signal frame of the signal in the 4 kHz band from which the echo is removed by using the WSD (operation 302). In an embodiment, the wearable electronic apparatus 100 may identify the probability whether the voice exists in each frame unit having the predetermined interval (e.g., frame interval of 10 ms) among the plurality of frames of the signals in the 4 kHz band.

In addition, the wearable electronic apparatus 100 may extract the parameter for detecting the humming by performing the signal feature extraction on the signal in the 4 kHz band from which the echo is removed (operation 304). That is, the wearable electronic apparatus 100 may identify whether the user's voice is the humming by analyzing the energy of the signal in the 4 kHz band, from which the echo is removed.

In addition, the wearable electronic apparatus 100 may identify the noise level of each frame (noise level calculation) for the other frame except the frame identified as including the user's voice based on a result of the WDS obtained using the internal microphone, among the plurality of frames of signals received by the external microphone (operation 404).

In addition, the wearable electronic apparatus 100 may identify whether the dialog situation exists in each frame of the signal (dialog detection) based on the probability whether the user's voice exists in each frame of the signal obtained by the WSD and the information on whether the user's voice obtained by the signal feature extraction is the humming (operation 306).

For example, the wearable electronic apparatus 100 may identify the other frame except the frame identified as that of the humming situation as the frame corresponding to the dialog situation among the frames of the signals, having the probability that the user's voice exists therein based on the predetermined value (e.g., 0.7) or more, using the signal feature extraction.

In addition, in an embodiment, the wearable electronic apparatus 100 may identify whether the dialog situation exists in each frame of the signal by further using a result of the noise level calculation of operation 404. That is, if a large noise exists in the frame of the signal, the result of the noise level calculation may be further used to correct a result of the dialog detection.

In addition, in operation 500, the wearable electronic apparatus 100 may determine whether to change the operation mode of the wearable electronic apparatus 100 (switching decision) by using: the information on whether the dialog situation exists in each frame of the signal based on the dialog detection using the internal microphone; and the noise level of each frame of the signal based on the noise level calculation using the external microphone and the internal microphone. In detail, the wearable electronic apparatus 100 may determine whether to change its operation mode in the same manner as shown in Tables 1, 2 and 3.

In addition, the operation mode may be controlled by the user of the wearable electronic apparatus 100. For example, the user of the wearable electronic apparatus 100 may change the operation mode using the operation mode control application installed in the wearable electronic apparatus 100.

In addition, in operation 502, the wearable electronic apparatus 100 may identify a result of the switching decision and whether the operation mode is changed in the operation mode control application, and may generate a signal to cancel the noise included in the audio signal received by the external microphone and the internal microphone based on the operation mode and provide the generated signal to the speaker.

For example, while being operated in the ANC mode, if music is played through a music player application, the wearable electronic apparatus 100 may control the signal to cancel the audio signal received by the external microphone to be generated, and may control the generated signal to be output to the speaker together with the music.

Figure 7:
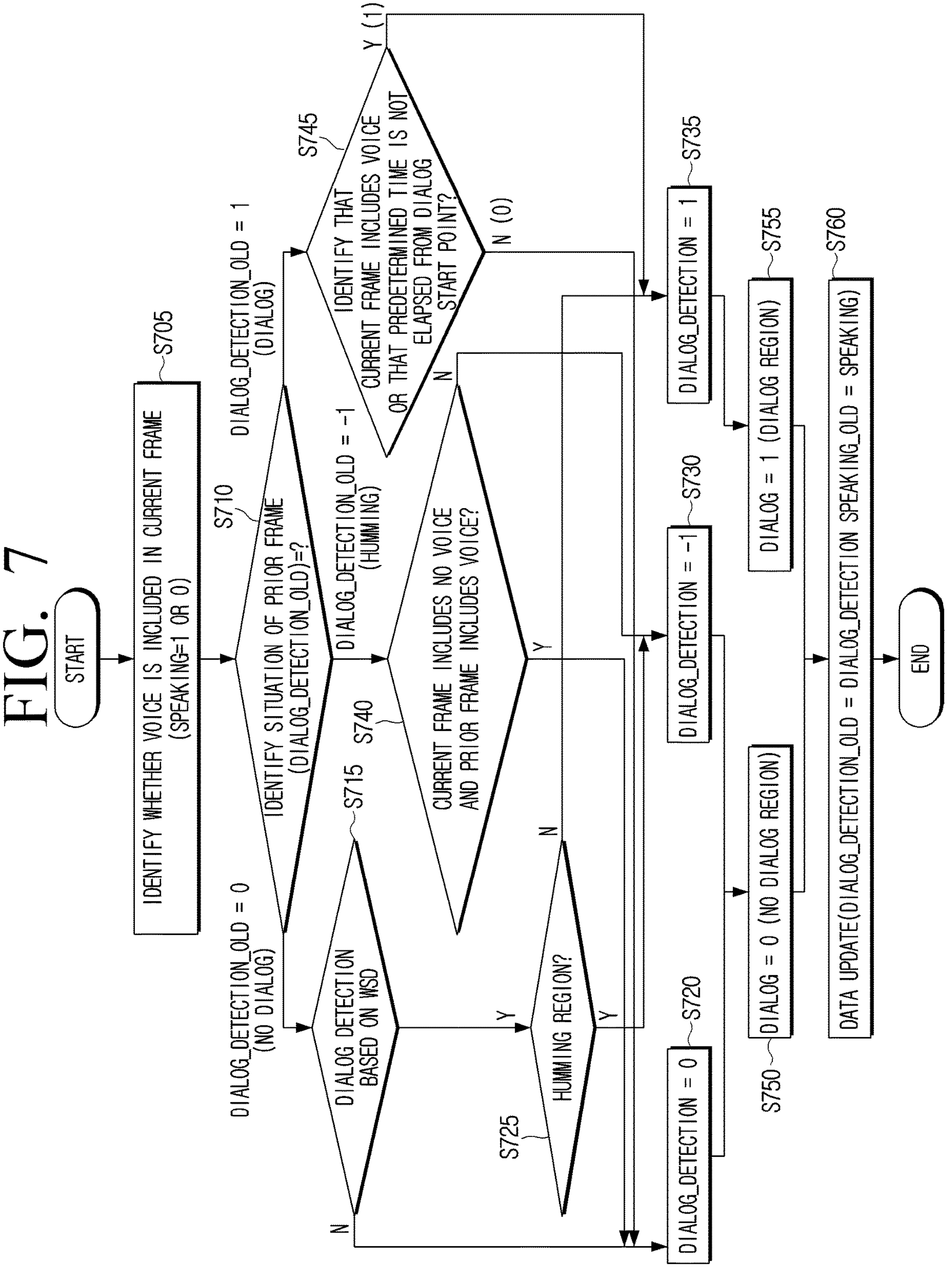
FIG. 7 is a flowchart showing a method of determining the operation mode according to an embodiment.

FIG. 7 is a flowchart showing a method of determining the operation mode according to an embodiment.

First, the wearable electronic apparatus 100 may identify whether the voice is included in the current frame (operation S705). In detail, the wearable electronic apparatus 100 may identify whether the voice is included in the frame of the signal obtained by the microphone 110 and the IMU sensor 120. In an embodiment, the wearable electronic apparatus 100 may identify whether the voice is included in each frame having the predetermined interval (e.g., frame interval of 10 ms) among the plurality of the frames of the signals. In addition, if the voice is included in the current frame, the wearable electronic apparatus 100 may identify that the frame is the frame corresponding to the voice (speaking=1). On the other hand, if no voice is included in the current frame, the wearable electronic apparatus 100 may identify that the frame is not the frame corresponding to the voice (speaking=0).

In addition, the wearable electronic apparatus 100 may identify whether a prior frame is the frame of the dialog situation (operation S710). In detail, the wearable electronic apparatus 100 may identify that whether the prior frame is the frame of the dialog situation (dialog_detection_old=?) based on the result obtained by the dialog situation identification module 4000 of FIG. 1 (operation S710). For example, the wearable electronic apparatus 100 may identify whether a region of the frame prior to that of the current frame having the predetermined interval (e.g., frame interval of 10 ms) is that of the dialog situation, no dialog situation or the humming situation.

If the prior frame is identified as a frame of no dialog situation (dialog_detection_old=0), the wearable electronic apparatus 100 may identify whether the current frame is the frame of the dialog situation based on the WDS (dialog detection) (operation S715).

If it is identified that the current frame is not the dialog situation (operation S715-N), the wearable electronic apparatus 100 may identify the current situation as no dialog situation (dialog detection=0) (operation S720). In addition, the wearable electronic apparatus 100 may identify the region of the current frame as no dialog region (dialog=0) (operation S750).

In addition, if the current frame is identified as the frame of the dialog situation (operation S715-Y), the wearable electronic apparatus 100 may identify whether the region of the current frame is a humming region (operation S725).

In addition, if it is identified that the region of the current frame is the humming region (operation S725-Y), the wearable electronic apparatus 100 may identify the current situation as the humming situation (dialog detection=−1) (operation S730). In addition, the wearable electronic apparatus 100 may identify the region of the current frame as no dialog region (dialog=0) (operation S750).

In addition, if it is identified the region of the current frame as no humming region (operation S725-N), the wearable electronic apparatus 100 may identify the current situation as the dialog situation (dialog detection=1) (operation S735). In addition, the wearable electronic apparatus 100 may identify the region of the current frame as a dialog region (dialog=1) (operation S755).

If it is identified that the prior frame is the frame of the humming situation (dialog_detection_old=−1) in S710, the wearable electronic apparatus 100 may identify whether the current frame includes no voice and the prior frame includes the voice (operation S740).

If it is identified that the current frame includes no voice and the previous frame includes the voice (operation S740-Y), the wearable electronic apparatus 100 may identify the current situation as no dialog situation (dialog detection=0) (operation S720). In addition, if it is identified that the current frame includes the voice or the prior frame includes no voice (operation S740-N), the wearable electronic apparatus 100 may identify that the current situation is the humming situation (dialog detection=−1) (operation S730).

If the prior frame is identified as the dialog situation (dialog_detection_old=1) in S710, the wearable electronic apparatus 100 may identify whether the current frame includes the voice (speaking=1) or whether the predetermined time (e.g., 5 seconds) is not elapsed from the dialog start point (operation S745).

That is, if the current frame includes the voice (speaking=1) (operation S745-Y), the wearable electronic apparatus 100 may identify that the current situation is the dialog situation (dialog detection=1) (operation S735). In addition, if the predetermined time (e.g., 5 seconds) is not elapsed from the dialog start point (operation S745-Y), the wearable electronic apparatus 100 may identify that the current situation is the dialog situation (dialog detection=1) (operation S735). In addition, the wearable electronic apparatus 100 may identify the region of the current frame as the dialog region (dialog=1) (operation S755).

On the other hand, if the current frame includes no voice (speaking=0), and the predetermined time (e.g., 5 seconds) is elapsed from the dialog start point (operation S745-N), the wearable electronic apparatus 100 may identify the current situation as no dialog situation (dialog detection=0)(operation S720). In addition, the wearable electronic apparatus 100 may identify the region of the current frame as no dialog region (dialog=0) (operation S750).

In addition, the wearable electronic apparatus 100 may update the result data of operations S750 and S755 (operation S760). That is, the wearable electronic apparatus 100 may update whether the current frame includes the dialog situation (dialog_detection) to whether the prior frame includes the dialog situation (dialog_detection_old), and whether the current frame includes the voice (speaking) to whether the prior frame includes the voice (speaking).

In addition, the wearable electronic apparatus 100 may continuously repeat operations S705 through S760.

Figure 8:
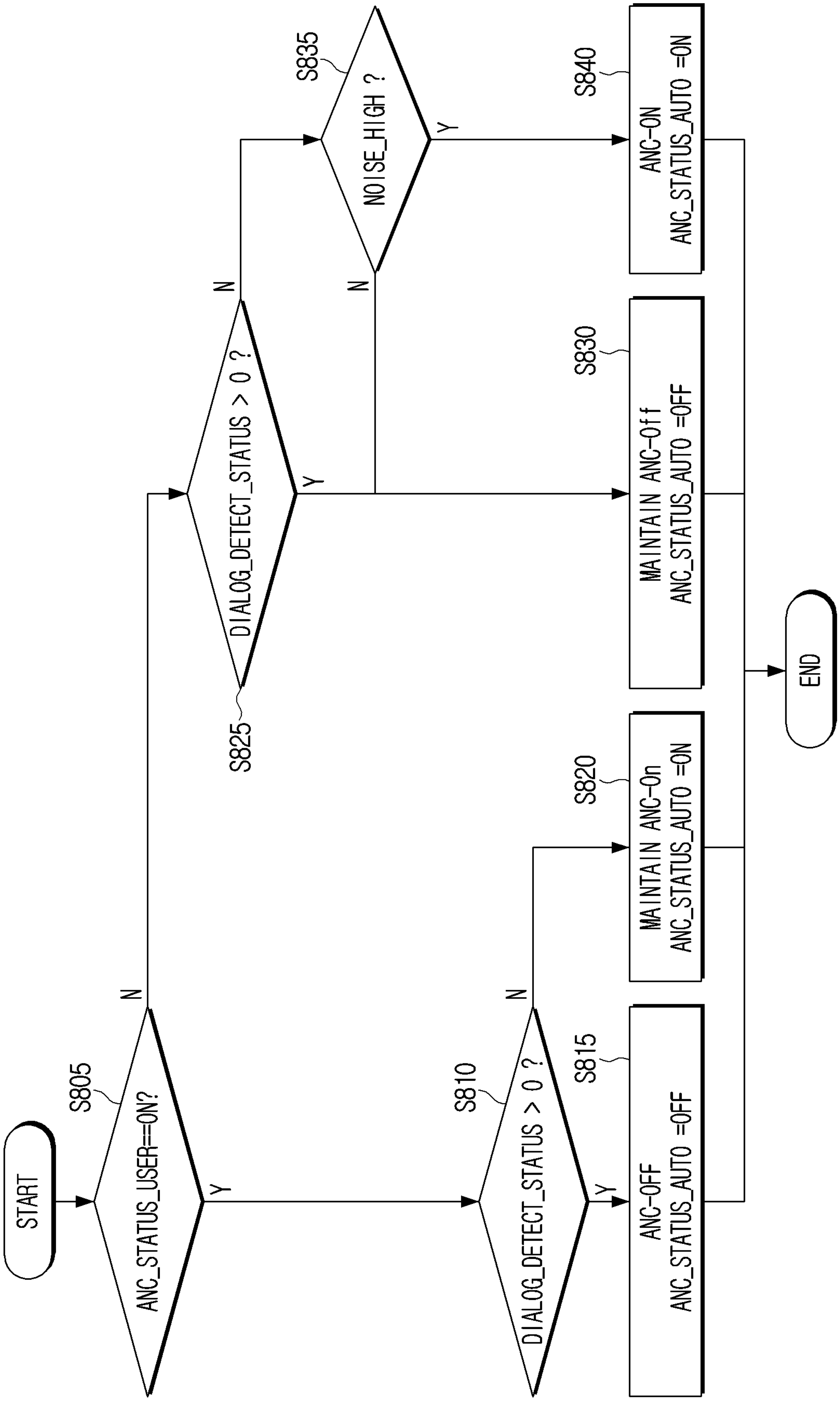
FIG. 8 is a flowchart showing a method of controlling the operation mode based on the dialog situation and the noise level according to an embodiment.

FIG. 8 is a flowchart showing a method of controlling the operation mode based on the dialog situation and the noise level according to an embodiment.

In an embodiment, the wearable electronic apparatus 10) may control the ANC mode to be turned on or off based on whether the current situation is the dialog situation and based on the noise level of the current frame.

In detail, it is possible to identify whether the wearable electronic apparatus 100 is currently operated in the ANC mode (ANC_status_user==on?) (operation S805). For example, the user of the wearable electronic apparatus 100 may identify whether its current operation mode is determined as the ANC mode.

If the wearable electronic apparatus 100 is currently operated in the ANC mode (operation S805-Y), the wearable electronic apparatus 100 may identify whether the current situation is the dialog situation (dialog_detect_status>0 ?) (operation S810). For example, as described above in FIGS. 1 through 6, the wearable electronic apparatus 100 may identify whether the current situation is the dialog situation using at least one of the IMU sensor, the internal microphone or the external microphone.

If it is identified that the current situation is the dialog situation (dialog_detect_status=1) (operation S810-Y), the wearable electronic apparatus 100 may control the ANC mode to be turned off (ANC_status_auto=off) (operation S815). For example, the wearable electronic apparatus 100 may control its operation mode to be the normal operation mode. However, the wearable electronic apparatus 100 is not limited thereto, and may control its operation mode to be the AMBIENT mode or the Noise Focusing mode.

If it is identified that the current situation is not the dialog situation (dialog_detect_status=0 or −1), the wearable electronic apparatus 100 may control the ANC mode to be maintained (ANC_status_auto=on) (operation S820). For example, if it is identified that the current situation as no dialog situation (dialog_detect_status=0) or the humming situation (dialog_detect_status=−1), the wearable electronic apparatus 100 may control the ANC mode to be maintained.

In addition, if the wearable electronic apparatus 100 is not currently operated in the ANC mode (operation S805-N), the wearable electronic apparatus 100 may identify whether the current situation is the dialog situation (dialog_detect_status>0 ?) (operation S825).

If it is identified that the current situation is the dialog situation (dialog_detect_status=1) (operation S825-Y), the wearable electronic apparatus 100 may control its operation mode to be maintained as the operation mode in which the wearable electronic apparatus 100 is currently operated (ANC_status_auto=off) (operation S830). That is, the wearable electronic apparatus 100 may control its current operation mode different from the ANC mode to be continuously maintained.

If it is identified that the current situation is not the dialog situation (dialog_detect_status=0 or −1), the wearable electronic apparatus 100 may identify whether the noise level has the predetermined value or more (operation S835). For example, the wearable electronic apparatus 100 may identify whether the noise level of the frame of the signal received by the external microphone is 80 dB or more.

If the noise level has a value less than the predetermined value (operation S835-N), the wearable electronic apparatus 100 may control its current operation mode to be maintained (ANC_status_auto=off) (operation S830). That is, the wearable electronic apparatus 100 may control its current operation mode different from the ANC mode to be continuously maintained.

If the noise level has the predetermined value or more (operation S835-Y), the wearable electronic apparatus 100 may control its operation mode to be the ANC mode (ANC_status_auto=on) (operation S840).

Figure 9:
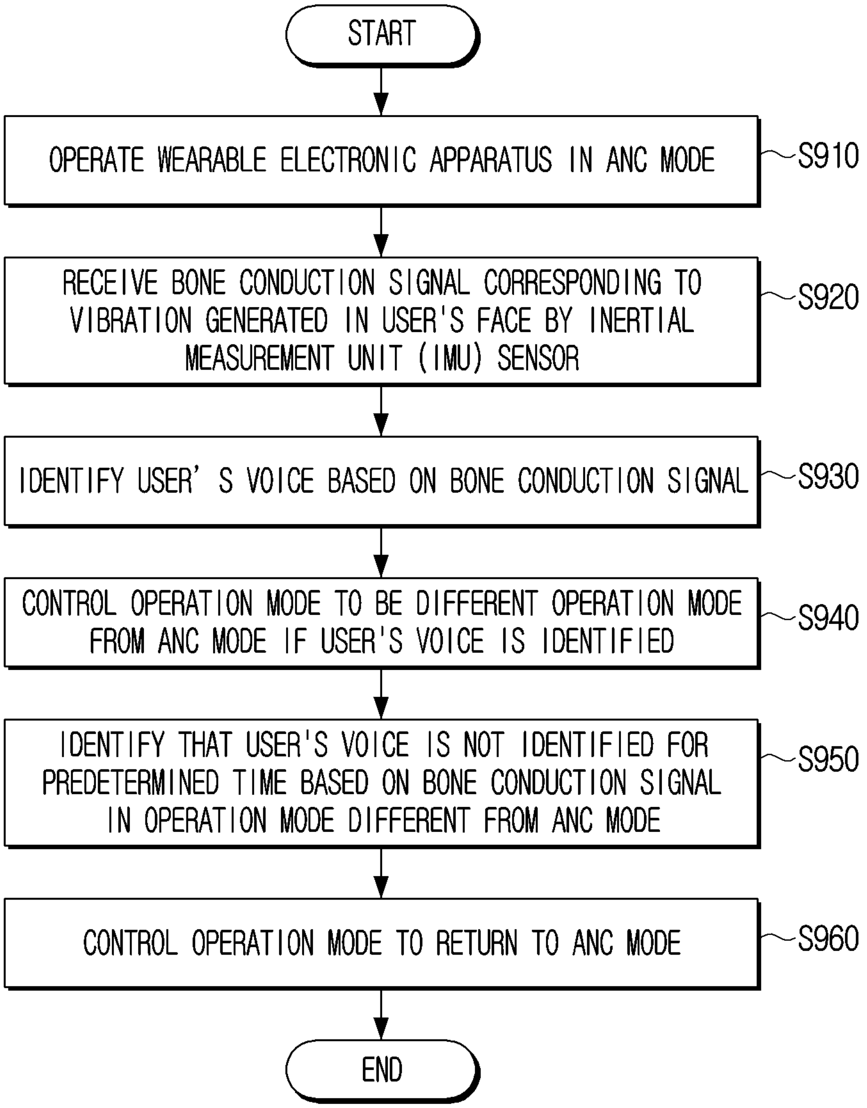
FIG. 9 is a flowchart showing a controlling method of a wearable electronic apparatus according to an embodiment.

FIG. 9 is a flowchart showing a controlling method of a wearable electronic apparatus according to an embodiment.

First, a wearable electronic apparatus 100 may be operated in an ANC mode (operation S910). For example, a user of the wearable electronic apparatus 100 may determine its operation mode as the ANC mode. However, the wearable electronic apparatus 100 is not limited thereto, and its current operation mode may be determined as the ANC mode according to an embodiment of FIG. 1.

In addition, the wearable electronic apparatus 100 may receive a bone conduction signal corresponding to vibration generated in the user's face by an IMU sensor while the wearable electronic apparatus is operated in the ANC mode (operation S920).

In addition, the wearable electronic apparatus 100 may identify the user's voice based on the bone conduction signal (operation S930).

In an embodiment, the wearable electronic apparatus 100 may receive the bone conduction signal by the IMU sensor, and may identify a probability whether the user's voice exists in a frame unit of the bone conduction signal, the frame unit having a predetermined interval, e.g., a predetermined duration. In addition, the wearable electronic apparatus 100 may identify that the identified frame unit is the frame in which the voice exists if it is identified that the probability indicating whether the user's voice exists in the frame unit having the predetermined interval has a predetermined value (e.g., 0.7) or more.

In addition, the wearable electronic apparatus 100 may control the operation mode of the wearable electronic apparatus 100 to be a different operation mode from the ANC mode if the user's voice is identified (operation S940). On the other hand, the wearable electronic apparatus 100 may control the ANC mode to be maintained if the user's voice is not identified.

In an embodiment, the different operation mode may include a normal operation mode in which an external noise is output as it is, an AMBIENT mode in which the external noise is emphasized, and a Noise Focusing mode in which an external voice is emphasized. However, an embodiment is not limited thereto, and may further include various operation modes.

In an embodiment, the wearable electronic apparatus 100 may identify whether a current frame is the frame of a humming situation if it is identified that the current frame is the frame in which the voice exists. In addition, the wearable electronic apparatus 100 may control the operation mode of the wearable electronic apparatus 100 to be the operation mode different from the ANC mode if it is identified that the current frame is not the frame of the humming situation as a result of the identification. On the other hand, the wearable electronic apparatus 100 may control the operation mode of the wearable electronic apparatus 100 to be maintained as the ANC mode if it is identified that the current frame is the frame of the humming situation as a result of the identification.

In an embodiment, the wearable electronic apparatus 100 may identify a noise level of the current frame by a microphone if it is identified that the current frame is the frame in which the voice exists. In addition, the wearable electronic apparatus 100 may control the operation mode of the wearable electronic apparatus 100 to be the Noise Focusing mode if the identified noise level has a predetermined value or more as a result of the identification. On the other hand, the wearable electronic apparatus 100 may control the operation mode of the wearable electronic apparatus 100 to be the AMBIENT mode if the identified noise level has a value less than the predetermined value.

In addition, while being operated in the operation mode different from the ANC mode, the wearable electronic apparatus 100 may identify that the user's voice is not identified for a predetermined time based on the bone conduction signal (operation S950). Here, the predetermined time may be five seconds, but is not limited thereto, and may be determined or changed by the user or manufacturer of the wearable electronic apparatus 100 such as three seconds, seven seconds, nine seconds, etc.

In addition, the wearable electronic apparatus 100 may control the operation mode to return to the ANC mode if it is identified that the user's voice is not identified for the predetermined time (operation S960). On the other hand, the wearable electronic apparatus 100 may control the different operation mode to be maintained if the user's voice is identified within the predetermined time.

Figure 10:
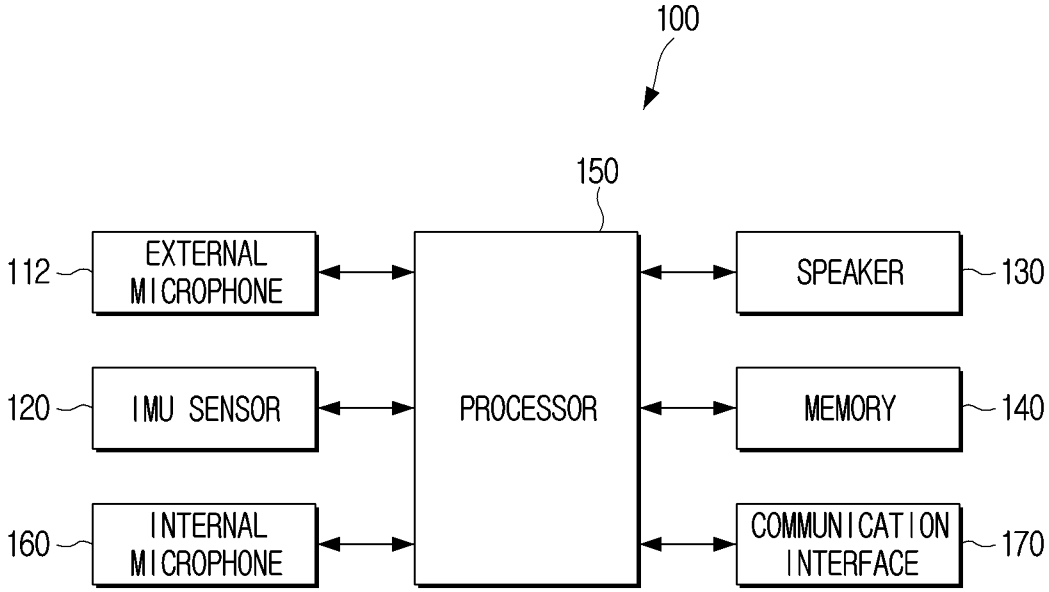
FIG. 10 is a block diagram showing a specific configuration of the wearable electronic apparatus according to an embodiment.

FIG. 10 is a block diagram showing a specific configuration of the wearable electronic apparatus according to an embodiment.

Referring to FIG. 10, the wearable electronic apparatus 100 may include the external microphone 112, the IMU sensor 120, the speaker 130, the memory 140, the processor 150, an internal microphone 160, and a communication interface 170. Meanwhile, the configurations of the external microphone 112, the IMU sensor 120, the speaker 130 and the memory 140 shown in FIG. 10 overlap with their configurations described in FIG. 1, and redundant description is thus omitted. In addition, according to an embodiment of the wearable electronic apparatus 100, some of the components of FIG. 1 may be removed or other components may be added thereto.

The external microphone 112 may be implemented as the external microphone disposed on the wearable electronic apparatus 100 to be positioned outside the user's ear like the external microphone of FIG. 1. In detail, the external microphone 112 may be configured to be positioned outside the user's ear, and receive the external noise.

According to an embodiment, the processor 150 may control the wearable electronic apparatus 100 to be operated in the ANC mode. For example, the user of the wearable electronic apparatus 100 may determine its operation mode as the ANC mode. However, the wearable electronic apparatus 100 is not limited thereto, and its current operation mode may be determined as the ANC mode according to an embodiment of FIG. 1.

In addition, while being operated in the ANC mode, the processor 150 may control the IMU sensor 120 to receive a bone conduction signal corresponding to vibration generated in the user's face. In addition, the processor 150 may identify the user's voice based on the bone conduction signal.

In an embodiment, the processor 150 may control the IMU sensor 120 to receive the bone conduction signal, and may identify the probability whether the user's voice exists in the frame unit of the bone conduction signal, the frame having the predetermined interval. In addition, the processor 150 may identify that the identified frame unit is the frame in which the voice exists if it is identified that the probability indicating whether the user's voice exists in the frame unit having the predetermined interval has the predetermined value (e.g., 0.7) or more.

In addition, the processor 150 may control the operation mode of the wearable electronic apparatus 100 to be an operation mode different from the ANC mode if the user's voice is identified. On the other hand, the processor 150 may control the ANC mode to be maintained if the user's voice is not identified.

In an embodiment, the different operation mode may include the normal operation mode in which the external noise is output as it is, the AMBIENT mode in which the external noise is emphasized, and the Noise Focusing mode in which the external voice is emphasized. However, an embodiment is not limited thereto, and may further include various operation modes.

In an embodiment, the processor 150 may identify whether the current frame is the frame of the humming situation if it is identified that the current frame is the frame in which the voice exists. In addition, the processor 150 may control the operation mode of the wearable electronic apparatus 100 to be the operation mode different from the ANC mode if it is identified that the current frame is not the frame of the humming situation as a result of the identification. On the other hand, the processor 150 may control the operation mode of the wearable electronic apparatus 100 to be maintained as the ANC mode if it is identified that the current frame is the frame of the humming situation as a result of the identification.

In an embodiment, the processor 150 may identify the noise level of the current frame by the external microphone 112 if it is identified that the current frame is the frame in which the voice exists. In addition, the processor 150 may control the operation mode of the wearable electronic apparatus 100 to be the Noise Focusing mode if the identified noise level has the predetermined value or more as a result of the identification. On the other hand, the processor 150 may control the operation mode of the wearable electronic apparatus 100 to be the AMBIENT mode if the identified noise level has a value less than the predetermined value.

In addition, while the wearable electronic apparatus 100 is operated in the operation mode different from the ANC mode, the processor 150 may identify that the user's voice is not identified for the predetermined time based on the bone conduction signal. Here, the predetermined time may be five seconds, but is not limited thereto, and may be determined or changed by the user or manufacturer of the wearable electronic apparatus 100 such as three seconds, seven seconds, nine seconds, etc.

In addition, the processor 150 may control the operation mode of the wearable electronic apparatus 100 to return to the ANC mode, if it is identified that the user's voice is not identified for the predetermined time. On the other hand, the processor 150 may control the different operation mode of the wearable electronic apparatus 100 to be maintained if the user's voice is identified within the predetermined time.

The internal microphone 160 may be disposed inside the user's ear, as described in FIG. 1, and is configured to receive the user's speech voice. For example, if the music audio data is output from the speaker of the wearable electronic apparatus 100, the music audio data may be received by the internal microphone 160. In addition, the user's speech voice may be received by the internal microphone 160.

The communication interface 170 is a configured to perform communication with the external apparatus. Meanwhile, the communicative connection of communication interface 170 and the external apparatus may include the communication therebetween performed via a third device (e.g., repeater, hub, access point, server or gateway). According to an embodiment, wireless communication may include at least one of, for example, wireless fidelity (Wi-Fi), Bluetooth, Bluetooth low energy (BLE), ZigBee, near field communication (NFC), magnetic secure transmission, radio frequency (RF) or a body area network (BAN).

In particular, the communication interface 170 may receive the audio data provided from an external electronic apparatus by performing communication with the external electronic apparatus. In addition, the processor 150 may control the speaker 130 to output the audio data.

Embodiments described herein may be variously modified and/or combined, and certain embodiments are thus illustrated in the drawings and described. However, it is to be understood that technologies mentioned in herein are not limiting, but include various modifications, equivalents, and/or alternatives. Throughout the accompanying drawings, similar components may be denoted by similar reference numerals.

In addition, embodiments described above may be modified in several different forms, and the scope and spirit of the disclosure are not limited to the embodiments. Rather, embodiments are provided to transfer the spirit of the disclosure to those skilled in the art.

Terms used herein are to describe the specific embodiments rather than limiting the scope of the disclosure. Singular forms used herein are intended to include plural forms unless explicitly indicated otherwise.

In an embodiment, an expression 'have', 'may have', 'include', 'may include' or the like, indicates existence of a corresponding feature (for example, a numerical value, a function, an operation, a component such as a part or the like), and does not exclude existence of an additional feature.

As used herein, an expression "A or B", "least one of A and/or B" or "one or more of A and/or B" or the like, may include all possible combinations of items enumerated together. For example, "A or B", "least one of A and B," or "at least one of A or B" may indicate all of 1) a case in which at least one A is included, 2) a case in which at least one B is included, or 3) a case in which both of at least one A and at least one B are included.

As used herein, the terms such as "1st" or "first," "2nd" or "second," etc., may modify corresponding components regardless of importance or order and are used to distinguish one component from another without limiting the components. For example, a first component may be referred to as a second component, and similarly, a second component may also be referred to as a first component. Therefore, the meanings of the elements are not limited by the terms, and the terms are also used just for explaining the corresponding embodiment.

If it is mentioned that any component (for example, a first component) is ("operatively or communicatively") coupled with/to or is connected to another component (for example, a second component), it is to be understood that any component is directly coupled to another component or may be coupled to another component through the other component (for example, a third component).

On the other hand, if it is mentioned that any component (for example, a first component) is "directly coupled" or "directly connected" to another component (for example, a second component), it is to be understood that the other component (for example, a third component) is not present between any component and another component.

An expression "configured (or set) to" used in an embodiment may be replaced by an expression "suitable for," "having the capacity to," "designed to," "adapted to," "made to" or "capable of" based on a situation. A term "configured (or set) to" may not necessarily mean "specifically designed to" in hardware.

Instead, an expression "an apparatus configured to" may mean that the apparatus may "perform-" together with other apparatuses or components. For example, "a processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In embodiments, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor except for a 'module' or an '~er/or' that needs to be implemented by specific hardware.

Meanwhile, various elements and regions in the drawings are schematically illustrated. Therefore, the spirit of the disclosure is not limited by relative sizes or intervals illustrated in the accompanying drawings.

Meanwhile, embodiments described herein may be implemented in a computer or a computer readable recording medium using software, hardware, or a combination of software and hardware. According to a hardware implementation, the embodiments described in an embodiment may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or electric units for performing other functions. In some cases, an embodiment may be implemented by the processor itself. According to a software implementation, embodiment may be implemented by separate software modules. Each of the software modules may perform one or more functions and operations described in an embodiment.

Embodiments may be implemented as software containing one or more instructions that are stored in machine-readable (e.g., computer-readable) storage medium (e.g., internal memory or external memory). A processor may call instructions from a storage medium and is operable in accordance with the called instructions. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

The non-transitory readable medium is not a medium that temporarily stores data therein, such as a register, a cache, a memory or the like, and indicates a medium that semi-permanently stores data therein and is readable by an apparatus. In detail, programs for performing the various methods described above may be stored and provided in the non-transitory readable medium such as a compact disc (CD), a digital versatile disc (DVD), a hard disc, a Blu-ray disc, a universal serial bus (USB), a memory card, a read only memory (ROM) or the like.

According to an embodiment, the methods may be included and provided in a computer program product. The computer program product may be traded as a product between a seller and a purchaser. The computer program product may be distributed in the form of a storage medium (for example, a compact disc read only memory (CD-ROM)) that may be read by the machine or online through an application store (for example, PlayStore™). In case of the online distribution, at least portions of the computer program product may be at least temporarily stored in a storage medium such as a memory of a server of a manufacturer, a server of an application store or a relay server, or be temporarily generated.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

The invention claimed is:

1. A controlling method of a wearable electronic apparatus worn on user's ears, the controlling method comprising:

receiving, by an inertial measurement unit sensor, a bone conduction signal corresponding to vibration generated in the user's face, while the wearable electronic apparatus is operated in an active noise cancellation (ANC) mode;

based on analyzing an energy of the bone conduction signal while the wearable electronic apparatus is operated in the ANC mode, identifying a dialog situation or a humming situation;

based on identifying the dialog situation while the wearable electronic apparatus is operated in the ANC mode, controlling an operation mode of the wearable electronic apparatus to be a different operation mode from the ANC mode;

while the wearable electronic apparatus is operated in the different operation mode, identifying the dialog situation or the humming situation based on the bone conduction signal;

based on an absence of the dialog situation being identified for a predetermined time while the wearable electronic apparatus is operated in the different operation mode, controlling the different operation mode to return to the ANC mode; and based on a presence of the dialog situation being identified within the predetermined time while the wearable electronic apparatus is operated in the different operation mode, controlling the different operation mode to be maintained.

2. The controlling method as claimed in claim 1, further including:

based on identifying the absence of the dialog situation while the wearable electronic apparatus is operated in the ANC mode, controlling the ANC mode to be maintained.

3. The controlling method as claimed in claim 1, wherein the identifying the dialog situation or the humming situation while the wearable electronic apparatus is operated in the ANC mode further includes:

identifying a probability indicating whether the user's voice exists in a plurality of frame units, respectively, that are included in the bone conduction signal, wherein the bone conduction signal is split into the plurality of frame units each having a predetermined duration; and identifying a frame unit among the plurality of frame units, as a current frame in which the user's voice exists based on the identifying that the probability for the frame unit has a predetermined value or more.

4. The controlling method as claimed in claim 3, wherein the controlling the operation mode to be the different operation mode further includes:

identifying whether the current frame corresponds to a humming based on the identifying that the user's voice exists in the current frame; and based on the identifying that the current frame does not correspond to the humming, controlling the operation mode of the wearable electronic apparatus to be the different operation mode from the ANC mode.

5. The controlling method as claimed in claim 4, further including:

based on the identifying that the current frame corresponds to the humming, controlling the operation mode of the wearable electronic apparatus to be maintained as the ANC mode.

6. The controlling method as claimed in claim 3, wherein the different operation mode includes a normal operation mode in which an external noise is output as is, an AMBIENT mode in which the external noise is emphasized, and a Noise Focusing mode in which an external voice is emphasized.

7. The controlling method as claimed in claim 6, wherein the controlling the operation mode to be the different operation mode further includes:

based on the identifying that the user's voice exists in the current frame, identifying a noise level of the current frame by using a microphone; and controlling the operation mode of the wearable electronic apparatus to be the Noise Focusing mode based on the noise level being identified to have a predetermined value or more.

8. The controlling method as claimed in claim 7, further including:

controlling the operation mode of the wearable electronic apparatus to be the AMBIENT mode based on the noise level being identified to have a value less than the predetermined value.

9. The controlling method of claim 1, wherein the controlling the different operation mode to return to the ANC mode further comprises:

based on determining that a noise level of an external noise is less than a predetermined threshold, controlling the different operation mode to be maintained; and based on determining that the noise level of the external noise is greater than or equal to the predetermined threshold, controlling the different operation mode to return to the ANC mode.

10. A wearable electronic apparatus worn on user's ears, the wearable electronic apparatus comprising:

a memory configured to store at least one instruction;

an inertial measurement unit (IMU) sensor; and a processor which is, by executing the at least one instruction stored in the memory, configured to control the IMU sensor to receive a bone conduction signal corresponding to vibration generated in the user's face while the wearable electronic apparatus is operated in an active noise cancellation (ANC) mode, based on analyzing an energy of the bone conduction signal while the wearable electronic apparatus is operated in the ANC mode, identify a dialog situation or a humming situation, based on identifying a presence of the dialog situation while the wearable electronic apparatus is operated in the ANC mode, control an operation mode of the wearable electronic apparatus to be a different operation mode from the ANC mode, while the wearable electronic apparatus is operated in the different operation mode, identify the dialog situation or the humming situation based on the bone conduction signal, based on an absence of the dialog situation being identified for a predetermined time while the wearable electronic apparatus is operated in the different operation mode, control the different operation mode to return to the ANC mode, and based on the presence of the dialog situation being identified within the predetermined time while the wearable electronic apparatus is operated in the different operation mode, control the different operation mode to be maintained.

11. The wearable electronic apparatus as claimed in claim 10, wherein the processor is further configured to, based on the identifying the absence of the dialog situation while the wearable electronic apparatus is operated in the ANC mode, control the ANC mode to be maintained.

12. The wearable electronic apparatus as claimed in claim 10, wherein the processor is further configured to identify a probability indicating whether the user's voice exists in a plurality of frame units, respectively, that are included in the bone conduction signal, wherein the bone conduction signal is split into the plurality of frame units each having a predetermined duration, and identify a frame unit among the plurality of frame units, as a current frame in which the user's voice exists based on the identifying that the probability for the frame unit has a predetermined value or more.

13. The wearable electronic apparatus as claimed in claim 12, wherein the processor is further configured to identify whether the current frame corresponds to a humming based on the identifying that the user's voice exists in the current frame, and based on the identifying that the current frame does not correspond to the humming, control the operation mode of the wearable electronic apparatus to be the different operation mode from the ANC mode.

14. The wearable electronic apparatus as claimed in claim 13, wherein the processor is further configured to, based on the identifying that the current frame corresponds to the humming, control the operation mode of the wearable electronic apparatus to be maintained as the ANC mode.

15. A non-transitory computer-readable storage medium storing at least one instruction which, when executed by a processor of a wearable electronic apparatus, causes the processor to execute a method including:

receiving, by an inertial measurement unit sensor of the wearable electronic apparatus, a bone conduction signal corresponding to vibration generated in the user's face, while the wearable electronic apparatus is operated in an active noise cancellation (ANC) mode;

based on analyzing an energy of the bone conduction signal while the wearable electronic apparatus is operated in the ANC mode, identifying a dialog situation or a humming situation;

based on identifying the dialog situation while the wearable electronic apparatus is operated in the ANC mode, controlling an operation mode of the wearable electronic apparatus to be a different operation mode from the ANC mode;

while the wearable electronic apparatus is operated in the different operation mode, identifying the dialog situation or the humming situation based on the bone conduction signal;

based on an absence of the dialog situation being identified for a predetermined time while the wearable electronic apparatus is operated in the different operation mode, controlling the different operation mode to return to the ANC mode; and based on a presence of the dialog situation being identified within the predetermined time while the wearable electronic apparatus is operated in the different operation mode, controlling the different operation mode to be maintained.

16. The non-transitory computer-readable storage medium of claim 15, wherein the method executed by the processor further includes:

based on identifying the absence of the dialog situation while the wearable electronic apparatus is operated in the ANC mode, controlling the ANC mode to be maintained.

17. The non-transitory computer-readable storage medium of claim 15, wherein, in the identifying the dialog situation or the humming situation while the wearable electronic apparatus is operated in the ANC mode, the method executed by the processor further includes:

identifying a probability indicating whether the user's voice exists in a plurality of frame units, respectively, that are included in the bone conduction signal, wherein the bone conduction signal is split into the plurality of frame units each having a predetermined duration; and identifying a frame unit among the plurality of frame units, as a current frame in which the user's voice exists based on the identifying that the probability for the frame unit has a predetermined value or more.

18. The non-transitory computer-readable storage medium of claim 17, wherein, in the controlling the operation mode to be the different operation mode, the method executed by the processor further includes:

identifying whether the current frame corresponds to a humming based on the identifying that the user's voice exists in the current frame; and based on the identifying that the current frame does not correspond to the humming, controlling the operation mode of the wearable electronic apparatus to be the different operation mode from the ANC mode.

19. The non-transitory computer-readable storage medium of claim 18, wherein the method executed by the processor further includes:

based on the identifying that the current frame corresponds to the humming, controlling the operation mode of the wearable electronic apparatus to be maintained as the ANC mode.

* * * * *